May 16, 1950     C. D. WICKS     2,507,656
STABILIZER MECHANISM FOR VEHICLE DRIVE SHAFTS
Filed March 4, 1947
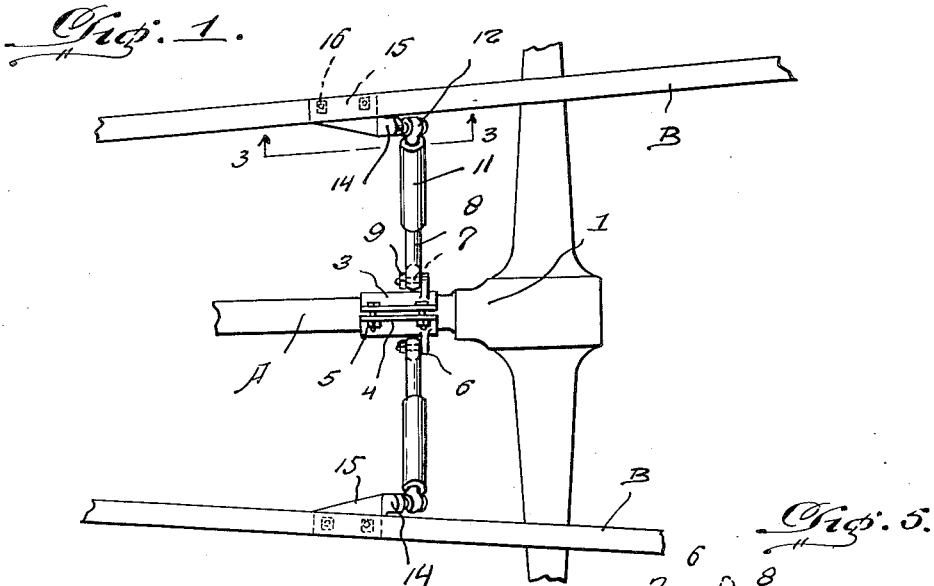
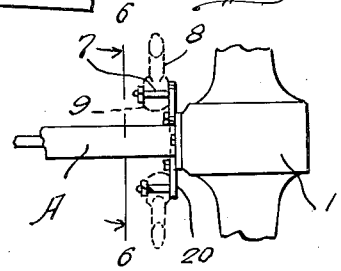
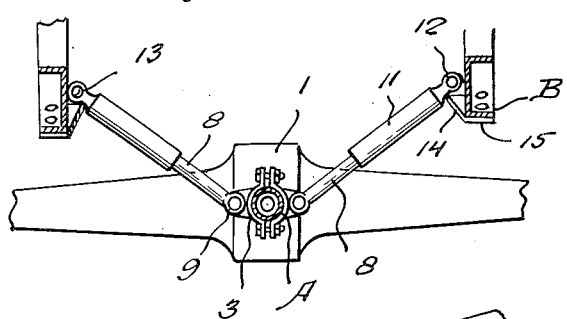
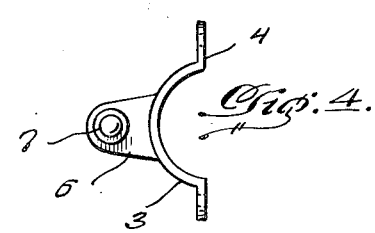
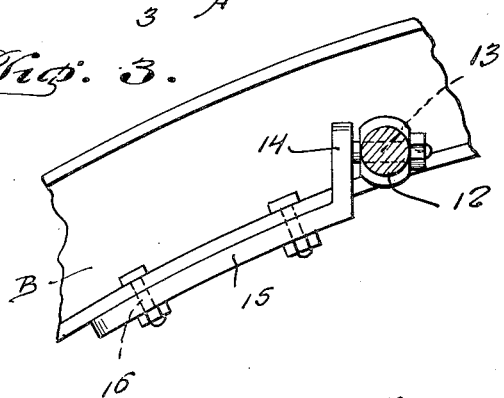
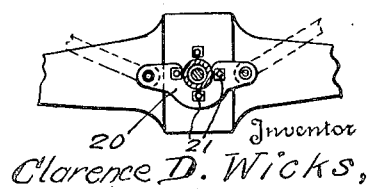
Inventor
Clarence D. Wicks,
By McMorrow, Berman and Davidson
Attorneys Patented May 16, 1950

2,507,656

UNITED STATES PATENT OFFICE 2,507,656

STABILIZER MECHANISM FOR VEHICLE DRIVE SHAFTS

Clarence D. Wicks, Big Spring, Tex.

Application March 4, 1947, Serial No. 732,300

4 Claims. (Cl. 180—85)

This invention relates to new and useful improvements in stabilizers and more particularly and specifically to a hydraulic stabilizer for automotive vehicles.

The primary object of this invention resides in the provision of a hydraulic stabilizer adapted to be secured between the drive shaft housing, adjacent the differential, and each side of the vehicle frame thereadjacent to increase the safety, comfort and security in operation of said vehicle at varied speeds and on uneven roads and during adverse driving conditions such as high winds and the like.

Another object of this invention is the provision of a device of the character described which reduces the vibrations in the body of the vehicle and increases the safety of the vehicle in taking sharp curves and rises at greater speeds.

Another and still further object of this invention is the provision of such a stabilizer as described which aids in and increases the ease with which a car may be handled in the event of tire blow-outs and especially blow-outs of the tires on the rear wheels.

Still a further object of this invention resides in the provision of a stabilizer of the character set forth which is of an extremely simple, durable, and inexpensive design and construction and which may be easily and inexpensively installed on vehicles now in use and in manufacture.

Still further improvements and advantages of this invention will readily appear to those skilled in the art when the following description is read in the light of the accompanying drawings in which:

Fig. 1 is a top plan view of the mounted stabilizer.

Fig. 2 is a front elevation of the mounted assembly.

Fig. 3 is a vertical section taken on line 3—3 of Fig. 1.

Fig. 4 is an enlarged end view of one-half of a stabilizer clamp attachable to the automobile torque tube.

Fig. 5 is a top plan view of a somewhat modified assembly.

Fig. 6 is a transverse cross-section taken on line 6—6 of Figure 5.

Referring now to the accompanying drawings which illustrates the preferred embodiment of this invention, together with one modified construction, and in which like numerals indicate similar parts. Throughout A designates that portion of the drive shaft casing immediately forward of the differential housing 1, and B designates the elongated side frame bars of the vehicle chassis.

A pair of semi-circular elongated half tube sections 3, which are provided with radially extended ears 4 bordering each longitudinal termination thereof, are disposed one on either side of said drive shaft housing A, and these sections are securely interlocked in a clamping position on said housing by threaded bolts and nuts 5 which penetrate and secure each of the adjacently disposed ears 4 of said sections.

A centrally disposed, diametrically extending ear 6 is formed outwardly from each of said sections horizontally from the differential adjacent ends thereof, and a pivot pin 7 is secured at one end to each such section and extends forwardly substantially parallel to the drive shaft housing A.

A pair of circular pistons 8 are pivotally secured, by means of respective eye sockets 9, one to each pin 7 to extend transversely toward the side frame members B of the vehicle chassis.

A respective cylinder 11 is slidably mounted upon each of said pistons and secured by an eye socket 12 at the outer end thereof to a pivot pin 13 carried longitudinally and horizontally with the corresponding chassis side frame members by an extended ear 14 formed on a bracket 15, said bracket including a plate secured by bolts or rivets 16 or the like to the frame side member B each telescopically associated piston and cylinder being components of a conventional, longitudinally-expansible and contractible shock absorber or hydraulic strut. Conventional shock absorber mechanism, including a compression spring, is disposed within each piston and cylinder assembly.

The two hydraulic struts extend outwardly and upwardly from the drive shaft housing to the corresponding chassis side frame members with their longitudinal center lines substantially in a plane perpendicular to the horizontal center line of the chassis.

Thus when the cylinder 11 is filled with a fluent material, movement of the chassis frame relative to the drive shaft housing and rear axle of the automotive vehicle will be hydraulically cushioned by the action of the diagonally-disposed shock absorbers or hydraulic strut assemblies.

In the modified form as illustrated in Figs. 5 and 6 the tubular means for connecting the pistons to the drive shaft casing is replaced by a flat semi-circular flanged plate 20 which is secured in a cradling position beneath said shaft casing and is secured to the front face of said differential by a plurality of threaded extended studs 21 with portions extending in diametrically-opposite directions from said housing.

The pistons are secured in a like manner to the extended sides of the plate 20 by respective pivot pins as in the previously described construction.

Thus it may be seen that a new and useful, as well as simple, durable and inexpensive stabilizer for automotive vehicles has been provided.

Having thus described and explained this invention and with full belief that modifications in size, materials and general characteristics would not constitute departure from the spirit of this invention what I desire to claim in Letters Patent is:

1. In an automotive vehicle having a pair of chassis side-frame members and a drive shaft housing disposed below and substantially medially of said frame members, the improvement which consists in providing a stabilizer assembly operatively connectible between said side-frame members and said drive shaft housing near the rearward end of the latter, said stabilizer assembly comprising a clamp mountable near the rearward end of the drive shaft housing, a pair of brackets attachable one to each of said side-frame members substantially in fore-and-aft alignment with said clamp, and a pair of longitudinally-contractible and expansible shock absorbers each pivotally connected at one end to said clamp and at its opposite end to a respective bracket.

2. In an automotive vehicle having a pair of chassis side-frame members and a drive shaft housing disposed below and substantially medially of said frame members, the improvement which consists in providing a stabilizer assembly operatively connectible between said side-frame members and said drive shaft housing near the rearward end of the latter, said stabilizer assembly comprising a clamp mountable near the rearward end of the drive shaft housing, a pair of brackets attachable one to each of said side-frame members substantially in fore-and-aft alignment with said clamp, and a pair of longitudinally-contractible and expansible shock absorbers each pivotally connected at one end to said clamp and at its opposite end to a respective bracket, and said clamp comprising a pair of substantially semi-circular sections each having apertured ears extending outwardly from the opposite edges thereof to receive attachment bolts, a centrally-disposed ear extending outwardly from one end of each section, and a pivot pin extending from the centrally-disposed ear along and spaced from the corresponding section to receive the corresponding end of the associated shock absorber.

3. In an automotive vehicle having a pair of chassis side-frame members and a drive shaft housing disposed below and substantially medially of said frame members, the improvement which consists in providing a stabilizer assembly operatively connectible between said side-frame members and said drive shaft housing near the rearward end of the latter, said stabilizer assembly comprising a clamp mountable near the rearward end of the drive shaft housing, a pair of brackets attachable one to each of said side-frame members substantially in fore-and-aft alignment with said clamp, and a pair of longitudinally-contractible and expansible shock absorbers each pivotally connected at one end to said clamp and at its opposite end to a respective bracket, and each of said brackets comprising a plate attachable to the corresponding chassis side-frame member, an upstanding ear at one end of the plate, and a pivot pin extending outwardly from said ear to receive the corresponding end of the associated shock absorber.

4. In an automotive vehicle having a pair of chassis side-frame members, a differential housing and a drive shaft housing extending forwardly from said differential housing and disposed below and substantially medially of said side-frame members, the improvement which consists in providing a stabilizer assembly operatively connectible between said side-frame members and said differential housing near the rearward end of said drive shaft housing, said stabilizer assembly comprising a clamp mountable on said differential housing near the rearward end of said drive shaft housing, a pair of brackets attachable one to each of said side-frame members substantially in fore-and-aft alignment with said clamp, and a pair of longitudinally-contractible and expansible shock absorbers each pivotally connected at one end to said clamp and at its opposite end to a respective bracket, said clamp comprising a plate apertured to receive the ends of bolts projecting from said differential housing adjacent the rearward end of said drive shaft housing and fitting around the lower portion of said drive shaft housing, said plate projecting outwardly from said housing in diametrically-opposite directions, and a pair of pivot pins secured one to each outwardly-projecting portion of said plate and extending along and spaced from said drive shaft housing to receive the corresponding ends of the associated shock absorbers.

CLARENCE D. WICKS.

REFERENCES CITED

The following references are of record in the file of this patent:

UNITED STATES PATENTS

| Number | Name | Date |
|---|---|---|
| 1,291,357 | Austin | Jan. 14, 1919 |
| 2,237,056 | Manning | Apr. 1, 1941 |
| 2,345,448 | Best | Mar. 28, 1944 |

FOREIGN PATENTS

| Number | Country | Date |
|---|---|---|
| 179,200 | Great Britain | Apr. 27, 1922 |